April 16, 1968     K. Q. KESSLER     3,377,785
FORAGE HARVESTER
Filed June 3, 1965     3 Sheets-Sheet 1
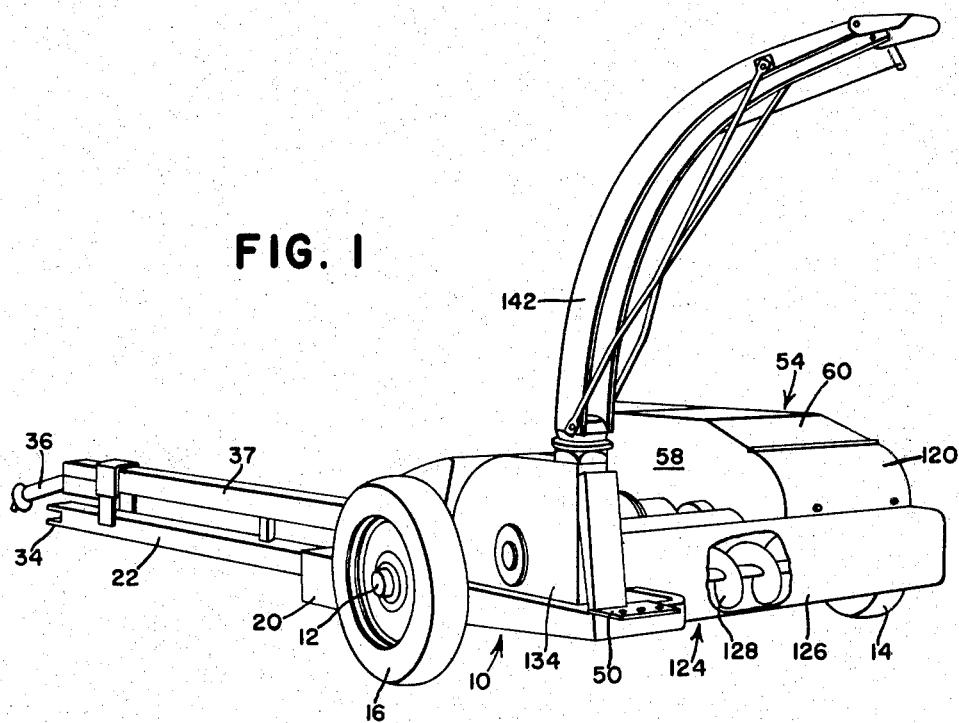
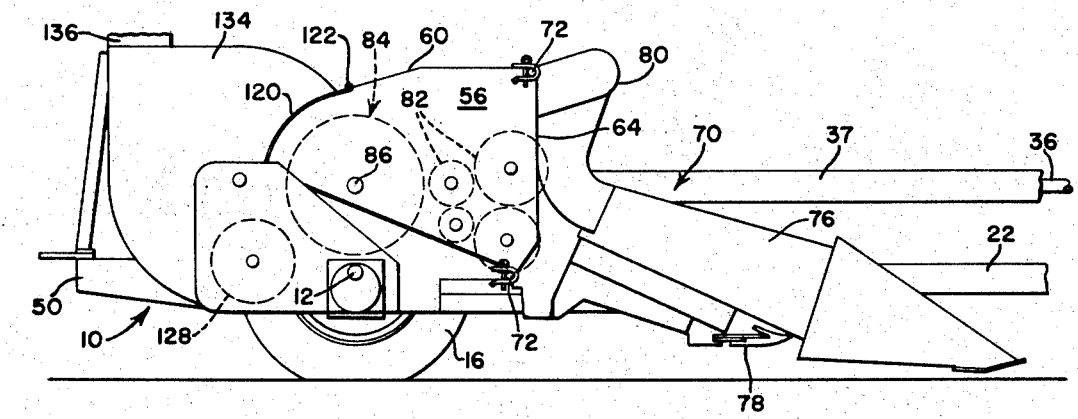
INVENTOR.
KENNETH Q. KESSLER
BY John M. Nolan
ATTORNEY April 16, 1968 — K. Q. KESSLER — 3,377,785
FORAGE HARVESTER
Filed June 3, 1965 — 3 Sheets-Sheet 2

INVENTOR.
KENNETH Q. KESSLER
BY John M. Nolan
ATTORNEY

INVENTOR.
KENNETH Q. KESSLER
BY John M. Nolan
ATTORNEY 3,377,785
FORAGE HARVESTER
Kenneth Q. Kessler, Ottumwa, Iowa, assignor to Deere & Company, Moline, Ill., a corporation of Delaware
Filed June 3, 1965, Ser. No. 460,898
8 Claims. (Cl. 56—16)

ABSTRACT OF THE DISCLOSURE

A pull-type forage harvester having a row crop harvesting unit at the right side of the frame for removing standing crop from the field and delivering it rearwardly to a reel type cutter which reduces the crop and propels it rearwardly through a recutter screen to a transverse auger, which moves the crop laterally to a blower-type elevator at the left side of the machine for elevating and rearwardly discharging the crop into a trailing vehicle.

---

This invention relates to an agricultural crop-handling machine and more particularly to a forage harvester which, typically, collects the crop from the field, reduces the crop by means of a rotary cutter, and delivers the chopped crop to a receptacle, conventionally a trailing wagon. The harvesting or collecting mechanism can be one of several interchangeable types, such as a row crop unit, a mower bar unit, or a crop pickup unit. The rotary type cutter is conventionally fed by and located rearwardly of the harvesting mechanism on the harvester frame.

In the case of a trailing or tractor-drawn machine, the harvesting mechanism and cutter are laterally offset from the tractor so that the tractor may move in the adjacent, previously harvested swath or row and thus, a considerable side draft on the machine must be compensated for.

In certain machines of this type, the rotary cutter functions as an impeller for delivery of the cut crop to the trailing wagon, but it has been found that, under certain crop conditions, the cutter will not adequately discharge the comminuted crop. In some instances, the crop is discharged from the cutter through a screen to further reduce the crop, often at the expense of lower efficiency of the cutterhead as a discharge impeller.

It is known to equip such a harvester with a blower type elevator to move the chopped crop to the trailing wagon. However, in machines of this type, the blower type elevator has been fed by and located rearwardly from the cutterhead. This, of course, increases the side draft on the machine and restricts access to the cutterhead. In addition, when a screen is associated with the cutterhead, the blower also restricts access to the screen, which is frequently removed or changed to accommodate different crop conditions. Furthermore, the size of the screen is limited since it must generally conform to the size of the blower inlet. Since the wagon is preferably towed in line with the tractor to avoid additional side draft on the machine, the blower in such a machine is laterally spaced from the wagon and, since the material is not directed the length of the wagon, there is a greater possibility of material loss during discharge.

According to the present invention, such a forage harvester, having an offset harvesting mechanism and a rotary cutter rearwardly disposed from the harvesting mechanism, is provided with a transverse auger which moves the material from the cutter to a blower which is mounted on the machine substantially in line with the tractor and the trailing wagon to obviate the above difficulties.

Thus, some of the objects of the present invention are to reduce the side draft on a forage harvester, to provide easier access to the cutterhead and cutter screen, if such a screen is used, to permit the use of a larger screen, to provide satisfactory discharge of the material regardless of crop conditions, and to direct the material discharge the length of the trailing wagon to reduce the material loss and to allow a more uniform filling of the wagon.

Other objects reside in the provision of a novel and larger screen for use in conjunction with the rotary type cutterhead, and further to provide such a screen in two easily removable sections.

Still another object is to provide such a machine having a novel and efficient arrangement of components and which is of simple and rugged construction and easy to maintain.

These and other objects will become apparent from a consideration of the following detailed description and accompanying drawings wherein:

FIG. 1 is a side and rear perspective of the forage harvester.

FIG. 3 is a side elevation view of the harvester, taken along the line 3—3 of FIG. 2, omitting the tractor, and schematically showing the rotary paths of the auger, cutterhead, and feed rolls.

In the ensuing description, it is to be understood that such terms as "forward," "rear," "right," "left," "upwardly," etc., are words of convenience and are not to be construed as limiting terms.

Figure 2:
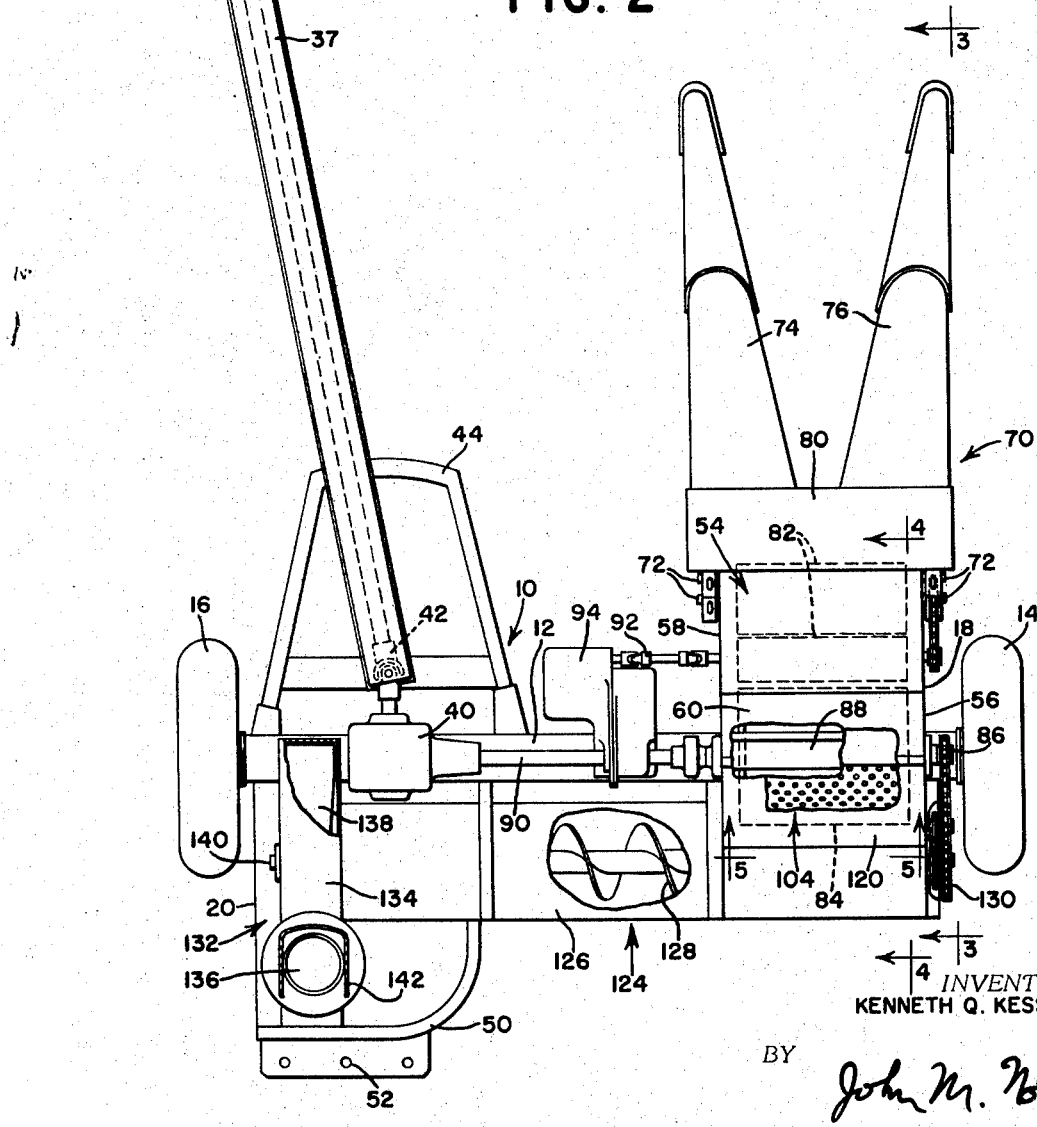
FIG. 2 is a plan view of the harvester, including a single-row crop harvesting mechanism and being towed by a tractor, which is partially shown.
Figure 4:
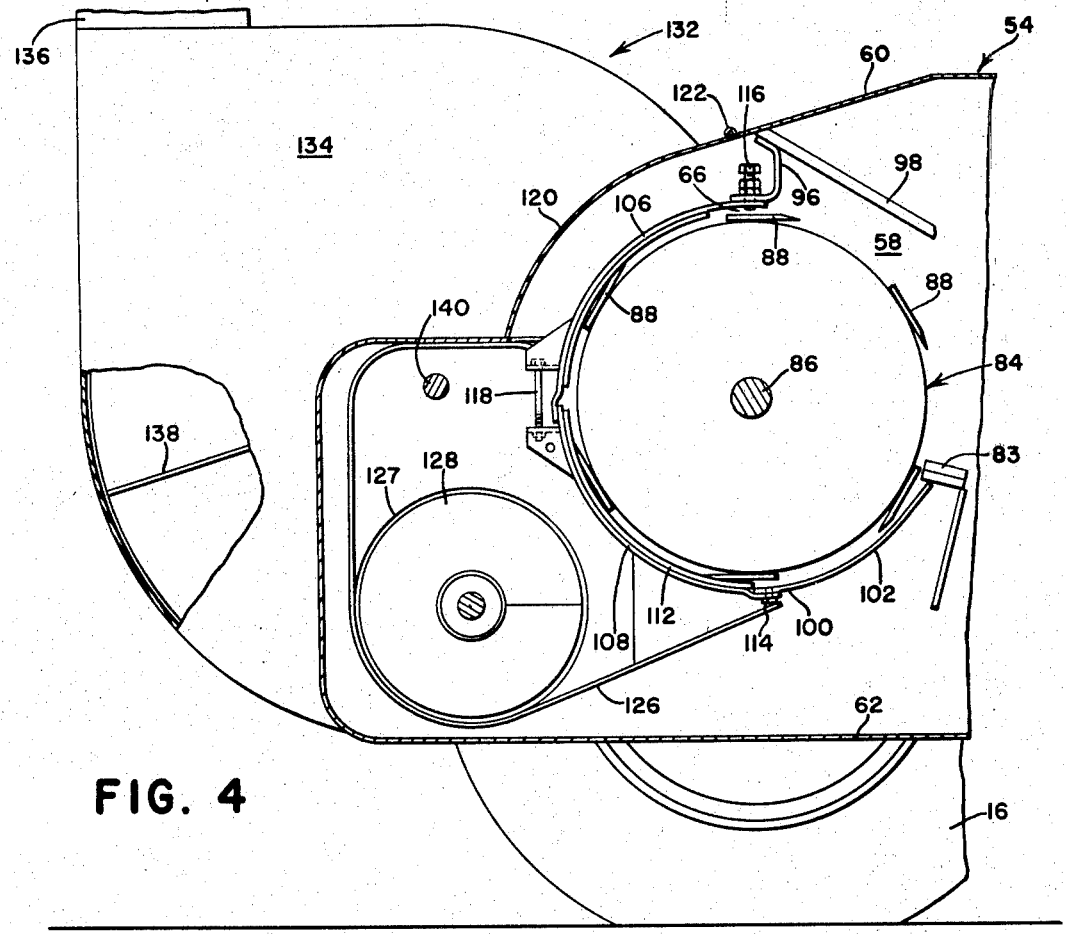
FIG. 4 is an enlarged partial section taken along the line 4—4 of FIG. 2.
Figure 5:
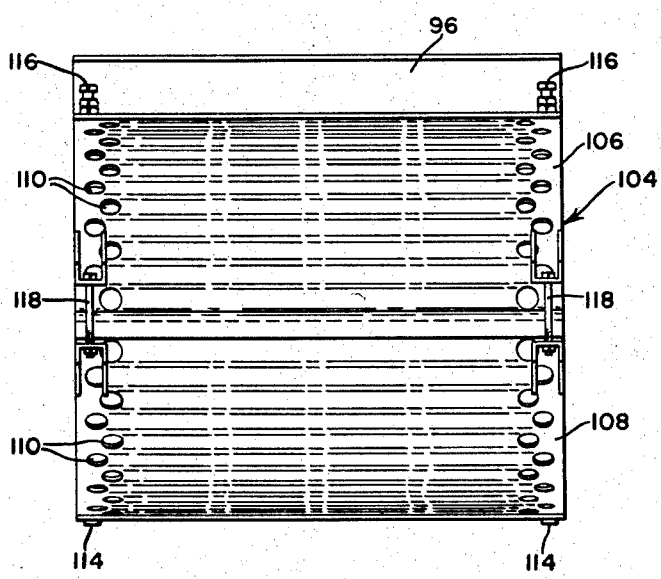
FIG. 5 is an enlarged rear view of the screen viewed along the line 5—5 of FIG. 2.

The forage harvester has a mobile main frame 10, including a transverse axle 12 supported at opposite ends by right and left ground-engaging support wheels 14 and 16. The frame 10 has right and left lateral sides 18 and 20, and a draft member 22, pivotally connected to the frame, extends forwardly from the left lateral side 20 for connection to a draft vehicle, partly shown in FIG. 2 as a tractor 24 mounted on rear drive wheels 26 via an axle 28 and having a drawbar 30 and a power take-off shaft 32. The draft member 22 includes a clevis 34 at its forward end for connection to the drawbar 30. A fore-and-aft drive shaft 36 is supported above the draft member 22 for rotation under a drive shield 37 and is connected at its forward end to the tractor power take-off shaft 32 by a universal joint 38 and at its rear end to a transmission means 40 by a universal joint 42. The shaft 36 also has a third universal joint 43 near its forward end. The frame 10 also includes a forwardly extending member 44 to which the draft member 22 is removably attached intermediate its ends in alternate positions for varying the lateral offset of the harvester relative to the tractor. In FIG. 2, the draft member is positioned in an operating position. During transport, the draft member is moved clockwise about its pivot to decrease the offset of the machine relative to the tractor. The frame 10 also includes a drawbar 50 at the rear of the left side 20 and having alternate attachment points 52 for connecting the forward end of the tongue of a trailing wagon (not shown).

The forage harvester includes a cutter housing 54, mounted on the frame proximate the right side 18, and having opposite lateral sides 56 and 58, a top 60 and a bottom 62 extending between said sides. The housing is open toward the front and rear respectively forming a front inlet 64 and a rear outlet 66.

A harvesting means 70, here shown as a single-row unit, is detachably mounted on the housing 54 at a plurality of attachment points 72 and is disposed ahead of the housing 54 for delivery of the crop rearwardly through the inlet 64. The particular harvesting means shown includes a pair of fenders 74 and 76, which divide and gather tall row crops such as corn, a sickle means 78 for severing the crop, and a transverse deflector 80 for orienting the crop longitudinally as it is fed into the inlet 64. Other harvesting means, such as a crop pickup unit or a mower unit having the same attachment points, can be easily substituted for the unit shown.

After moving through the inlet 64, the crop is engaged and fed rearwardly by two pairs of feed rolls 82 to a transverse stationary knife 83, mounted between the housing sides 56 and 58, and then into a rotating cylinder-type cutterhead 84. The cutterhead 84 includes a transverse shaft 86, journaled at opposite ends in the housing 54, and a plurality of knives 88, which extend in a longitudinal direction on the cutterhead periphery and register with the stationary knife 83. The cutterhead 84 is rotated by a transverse drive shaft 90 driven through the transmission 40 and coaxially joined with the shaft 86, and the feed rolls 82 are rotated by a drive means 92 connected to the drive shaft 90 through a transmission 94, the length of the cut depending upon the rate of feed of the crop, which is conventionally varied via the transmission 94.

The housing outlet 66 extends horizontally between the sides 56 and 58 and vertically between a rear portion 96 of an upper deflector member 98 and a rear edge 100 of a lower deflector member 102 which extends rearwardly from the stationary knife.

An approximately semicylindrical screen 104 is removably mounted across the outlet 66, coaxial with the cutterhead 84, the screen being formed by a pair of arcuate screen members 106 and 108 having an abutting longitudinal edge. Each screen member has a plurality of apertures 110 through which the crop is forced by the cutterhead to further reduce the crop, the degree of reduction depending on the size of the apertures. The screen is supported at oposite ends by a pair of arcuate key strips 112 affixed to the housing sides 56 and 58, and is removably installed by placing the screen member 108 against the key strips 112 and inserting a plurality of radial pins 114, which project from the lower edge of the screen member 108, into corresponding apertures in the rear edge 100 of the deflector 102. The upper screen 106 is then placed against the key strips, the upper edge of the screen 106 being locked to the rear portion 96 of the deflector 98 by means of a plurality of spring-loaded detents 116, which are carried by the deflector 98 and engageable with apertures in the upper screen member 106. The screen members are then drawn tightly against the key strips 112 by tightening a plurality of tangential bolts 118 attached at opposite ends to the upper and lower member 106 and 108.

A rear portion 120 of the housing top 60 lifts upwardly about a transverse pivot 122 to provide greater access to the cutterhead 84 and the screen 104.

A transverse conveyor means 124 includes a conveyor housing 126 having an inlet conforming with the cutter housing outlet 66 and an outlet 127 proximate to the lateral side 20. A transverse auger 128 is rotated within the housing 126 via a drive means 130, which is connected to the cutterhead shaft 86, and moves the reduced crop from the cutter housing outlet 66 through the conveyor outlet 127.

An elevator means 132 includes a housing 134 mounted on the frame 10 proximate to the side 20 and having an inlet conforming to the conveyor outlet 127, and an upwardly directed outlet 136. A rotary impeller 138 rotates on a transverse shaft 140 to accelerate and tangentially discharge the crop through the outlet 136 via an arcuate discharge spout 142, which extends upwardly from the outlet 136 and directs the material to a trailing collector vehicle.

In operation, the harvesting means 70 removes the crop from the field and delivers it rearwardly to the feed rolls 82, which feed the crop to the cutterhead 84. The cutterhead chops the crop at the stationary knife 83 and propels it rearwardly, forcing it through the screen 104, if the screen is installed. The screen establishes the maximum length of cut since the crop is further reduced when it is forced through the apertures 110. The relatively large screen area increases the machine capacity and decreases recirculation of the chopped crop, thereby decreasing laceration of the crop and the power requirement for rotation of the cutterhead.

The screen can be quickly removed or replaced with a different screen size to accommodate changes in crop conditions, such as a change in the moisture content of the crop. For example, when the moisture content is high, such as early in the morning, if the screen size is too small, the machine will plug. Moreover, when the material is wet, a longer cut is acceptable, so the screen may be removed or a screen with larger apertures may be utilized. Since a longer cut of dry material creates difficulty in moving the crop and since a finer cut crop is more palatable for livestock, as the crop dries, a screen with smaller apertures should be installed to provide the desired fine cut.

After the crop passes through the screen 104, the conveyor means 124 moves the crop laterally to the discharge elevator means 132, which is mounted on the frame 10 substantially in line with the tractor and the trailing vehicle.

Other features and advantages of the present invention will readily occur to those skilled in the art, as will many modifications and alterations in the preferred embodiment of the invention described herein, all of which may be achieved without departing from the spirit and scope of the invention.

What is claimed is:

1. A forage harvester comprising: a mobile main frame having first and second lateral sides and including a generally fore-and-aft draft member extending forwardly from the first side of the frame; a cutter housing mounted on the frame proximate to the second side and laterally spaced from the first side and the draft member and having a forward inlet; an axially transverse rotary reel type cutterhead rotatably mounted in the housing and having an associated stationary knife mounted in the housing adjacently forwardly of and parallel to the cutterhead periphery; a harvesting means mounted on and extending forwardly from the cutter housing and laterally spaced from the draft member, and adapted to remove crops from the field and deliver them rearwardly through the housing inlet; feed means mounted in the housing for moving the crops from the harvesting means to the cutterhead which reduces the crop; a transverse conveyor means mounted on the frame rearwardly of the cutterhead and adapted to receive the reduced crop from the cutterhead and move it laterally to its discharge end proximate to the first lateral side; a blower type elevator means mounted on the frame proximate to the first lateral side and adapted to receive the crop from the conveyor means and discharge it upwardly and rearwardly.

2. The invention defined in claim 1 wherein the cutter housing includes a rearward outlet and the transverse conveyor means includes an enclosed conveyor housing mounted on the frame rearwardly of the cutterhead and having an inlet communicating with the cutter housing outlet, said housing extending from the second side of the frame to the elevator, and an auger rotatably mounted in the conveyor housing axially parallel to and downwardly and rearwardly of the cutterhead axis; and including an arcuate screen coaxially associated with and adjacent to the cutterhead and mounted over the cutter housing outlet between the cutterhead and the auger, and an access door formed by the cutterhead housing extending the width of the housing upwardly and rearwardly of the cutterhead axis and above the conveyor housing and swingable about a transverse axis to provide access to the cutterhead and cutterhead screen.

3. A forage harvester for trailing attachment to a tractor having a rearward power take-off shaft and comprising: a generally L-shaped main frame including a transverse portion having first and second opposite lateral sides and supported above the ground on a pair of ground-engaging wheels disposed at said opposite lateral sides and a fore-and-aft portion including a fore-and-aft draft member extending forwardly from the first lateral side and having its forward end attachable to the tractor; a cutter housing mounted on the transverse portion of the frame adjacent its second lateral side, laterally spaced from the draft member, and having a forward inlet opening and a rearward outlet opening; a harvesting means removably mounted on and extending forwardly from the cutter housing and adapted to remove crops from the field and thence rearwardly through the inlet opening; feed means operatively associated with the housing inlet and adapted to feed the crop moving through the inlet rearwardly; an axially transverse reel type cutterhead rotatably mounted in the cutter housing and having an associated stationary knife mounted in the housing adjacently forward of and parallel to the cutterhead periphery, the cutterhead being adapted to reduce crop material moving rearwardly from the feed means and discharge the reduced crop material rearwardly through the outlet opening; a transverse conveyor means mounted on the transverse portion of the frame, having an intake end proximate to the second lateral side and communicating with the housing outlet opening and a discharge end disposed proximate to the first lateral side, and adapted to receive the crop material moving through the housing outlet opening and move it laterally to its discharge end; an axially transverse blower type elevator means mounted on the transverse frame portion proximate to its first side and adapted to receive the crop material from the discharge end of the conveyor means, elevate it, and discharge it horizontally; and a drawbar mounted on and extending rearwardly from the transverse portion of the frame proximate to its first side and in substantial fore-and-aft alignment with the fore-and-aft portion of the frame.

4. The invention defined in claim 1, including a screen associated with the cylindrical cutterhead between the conveyor means and the cutterhead and through which the chopped crop passes to the conveyor means.

5. The invention defined in claim 4, wherein the screen is approximately semicylindrical and coaxially associated with the rearward portion of the cutterhead.

6. The invention defined in claim 5 wherein the conveyor means comprises an elongated transverse housing having an inlet communicating with the cutter housing and an outlet communicating with the blower inlet, and a transverse auger rotating in said housing for moving the crop into the outlet.

7. A forage harvester comprising: a mobile main frame having first and second lateral sides and mounted for advance over a field on a pair of support wheels via a draft member extending forwardly from the frame proximate to the first lateral side; a cutterhead housing mounted on the frame between the lateral sides proximate to the second side and having a forwardly disposed inlet and a rearwardly disposed outlet; a harvesting means detachably mounted on the frame forwardly of the cutterhead housing for removing the crop from the field and moving it rearwardly through the cutterhead housing inlet; feed means operatively associated with the housing inlet and adapted to feed the crop moving through the inlet rearwardly; an axially transverse cylindrical cutterhead having a plurality of longitudinal knives on its outer periphery and mounted for rotation within the cutterhead housing for chopping the crop and moving it rearwardly through the housing outlet; a transverse conveyor means mounted on the frame, having an inlet communicating with the cutterhead housing outlet and an outlet proximate to the first lateral side, for moving the chopped crop laterally from the cutterhead housing through the conveyor means outlet; a blower housing mounted on the frame and having an inlet communicating with the conveyor means outlet and an upwardly directed outlet; an impeller rotatable within the blower housing for accelerating the crops from the inlet upwardly through the blower housing outlet; and drive means operably connected to and for driving the harvesting means, the cutterhead, the conveyor means, and the impeller.

8. The invention defined in claim 7 and including an approximately semi-cylindrical screen removably mounted within the cutterhead housing coaxially with the cutterhead between the cutterhead and the conveyor means inlet.

References Cited

UNITED STATES PATENTS

| | | | |
|---|---|---|---|
| 2,663,985 | 12/1953 | Hinson | 56—16 X |
| 2,763,115 | 9/1956 | Skromme | 56—16 |
| 2,803,101 | 8/1957 | Lundell | 56—24 X |
| 3,088,263 | 5/1963 | Thompson | 56—24 X |
| 3,165,875 | 1/1965 | Mitchell | 56—24 |
| 3,187,490 | 6/1965 | Mitchell | 56—16 |

ANTONIO F. GUIDA, *Primary Examiner.*